July 20, 1965          D. B. SCOTT ETAL          3,195,273
                       SOIL SEALING METHOD
                       Filed Jan. 5, 1962

INVENTORS
David B. Scott
BY Robert P. Watwood

United States Patent Office 3,195,273
Patented July 20, 1965

3,195,273
SOIL SEALING METHOD
David B. Scott and Robert P. Watwood, both of Salinas, Calif., assignors, by mesne assignments, to Union Carbide Corporation, a corporation of New York
Filed Jan. 5, 1962, Ser. No. 164,555
3 Claims. (Cl. 47—58)

This invention relates to the treatment of soil with agricultural chemicals and the like. More particularly, it relates to a method for preserving and maintaining agricultural chemicals in soil after the soil has been treated with the chemicals.

In a preferred embodiment the present invention provides a method for sealing the surface of a seed bed to inhibit the escape of soil treatment chemicals which have previously been placed therein which comprises spraying a film over the surface of a seed bed with a resin in liquid form. Preferably the resin is water soluble and is sprayed in an aqueous solution. The resin, having been applied in spray form in a suitable liquid carrier, forms a film on the bed and surface which serves as an encasement to prevent loss to the surrounding atmosphere of various agricultural chemicals such as nematocides, herbicides and the like.

Figure 1:
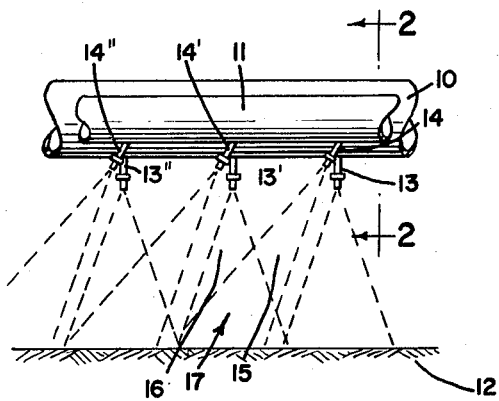

In the accompanying drawings there is shown schematically in:

FIG. 1 in side elevation a portion of suitable conduits and discharge nozzles for applying a liquid resin sealant in accordance with the present invention.

Figure 2:
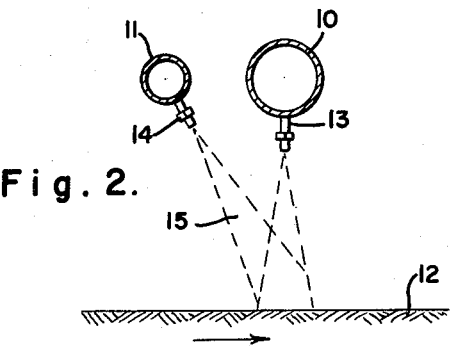

FIG. 2 shows in end section a pair of suitable conduits and discharge nozzles for applying a resin sealant to the surface of soil in accordance with the present invention and taken along line 2—2 of FIG. 1.

In recent years the use of various agricultural chemicals has become increasingly important. These chemicals for the most part are quite volatile in nature. Consequently their efficacy is of limited duration when placed in the soil at the normal working depths. Obviously, if the chemical has volatilized and escaped in whole or in part, it is no longer available for performing its allotted function.

To remedy the foregoing situation several approaches have heretofore been tried. For example, it has been proposed to cover the treated seed beds with a pre-formed covering of suitable fluid impervious materials to prevent the volatilization of the agricultural chemicals. Thus a layer or tarp of plastic or paper has been used by unreeling rolls of the selected material so as to cover a seed bed that has been treated with chemicals.

While this technique has been relatively successful in preventing the escape of the chemicals, it has certain inherent disadvantages. The more outstanding ones include the fact that the rolls of tarp or film are relatively expensive when used in the volume necessary to cover all of the seed beds on a given farm. Further, it is a relatively slow and difficult procedure to lay the tarp on the seed beds in such a way as to insure a closure or sealing thereof. Most important, after the chemicals have performed their function and the tarp or pre-formed covering is no longer needed, another operation is necessary to remove the tarp before further farming the land.

The present invention eliminates all of the foregoing disadvantages and offers additional advantages as well. Thus the use of resins in liquid form so that they may be sprayed on the land permits a rapid application thereof. The employment of a suitable number of spray nozzles or equivalent structures for applying the resin permits rapid movement over an agricultural area while leaving behind the desired complete chemical retaining covering. Suitable resins for this purpose, especially the water soluble resins when used in an aqueous medium, provides an acceptably economical material for the present method as opposed to the cost of prior materials used for the same purpose. Most important, the types of materials to be employed herewith, while serving as an adequate sealant to prevent the escape of the chemicals, have the significant advantage of not being required to be removed before further farming the land. The present materials when suitably selected may be further disintegrated with the soil and incorporated therein to serve as soil conditioners. Consequently, the sprayed coating ultimately enhances water retentive capacity and improves the soil structure in general as well as functioning in other desirable ways.

More specifically, the present invention may be practiced as schematically illustrated in the accompanying drawings. In the embodiment illustrated, a pair of horizontal conduits 10 and 11 are supported above a seed bed 12 by a suitable means (not shown) which may take the form of a tractor having appropriate brackets for the conduits. Conduit or pipe 10 has a plurality of discharge nozzles 13, 13', 13" depending therefrom substantially perpendicular to seed bed 12. The direction of travel of the tractor carrying the conduits, is indicated by the arrow in FIGURE 1.

Conduit 11 has a plurality of corresponding discharge nozzles 14, 14', 14" depending therefrom but angularly displaced with respect to the normal to bed 12. As a result of the angular displacement of nozzle 14, the spray cone 15 from nozzle 14 converges with and intersects the spray cone 16 from nozzle 13' above the surface of bed 12 at 17. (See FIG. 1 in particular.) Similar spray intersections occur between the remaining nozzles as illustrated. Conduits 10, 11 are gradually moved over the area to be sealed.

In practicing the invention, a 1% aqueous solution of a water soluble resin such as the carboxyvinyl polymer in free acid form known as Carbopol 934 may be supplied to conduit 10 from a suitable source (not shown) such as a storage tank. Preferably the solution is maintained under pressure and is forced in spray form through nozzles 13, 13', 13" in the direction of seed bed 12 as illustrated. Simultaneously therewith a neutralizing solution such as ammonia or equivalent base in an aqueous solution (about 1% solution by volume is suitable for use with the 1% Carbopol 934 noted above) may be supplied to conduit 11 from a suitable source (not shown) and preferably under pressure.

The base is emitted in spray form through nozzles 14, 14', 14". As the ammonia solution intermingles and intersects with the resin spray from nozzles 13, 13', 13", the resin virtually instantly gels so that when it strikes the surface of bed 12 it is in a relatively solidified fluid impervious form. The neutralized resin provides a coating or film over the bed which prevents escape of agricultural chemicals which may have previously been disseminated into bed 12.

The foregoing discussion described the use of one particular type of water soluble resin which utilizes a secondary stream for neutralization to cause the resin to be placed into its most beneficial form for present purposes. It will be appreciated by those skilled in the art that certain other water soluble resins such as the hydroxyethyl celluloses do not require additional treatment to provide the desired solidifying properties. When using this latter type of resin, it may be applied simply by utilizing half the apparatus illustrated, i.e. pipe 10 and related spray nozzles, and the same end purpose is accomplished.

While aqueous soluble resins are preferred in the present invention for economic factors, the present invention should not be construed as being limited to such resins. The apparatus illustrated in the drawings may be used equally well with other types of resins such as polyesters wherein the resin in liquid form with or without a solvent is supplied through pipe 10 and the solidifying stream containing a suitable catalyst for the resin such as a peroxide supplied from pipe 11. As a result polymerization occurs at the intersection of the two sprays as at 17 and the end result it identical to that when the water soluble resins are employed.

As already mentioned, the particular resin selected may be used for its additional properties beyond its sealing and treatment chemical retaining effect. Thus when certain resins well known to the art are employed they may subsequently be disintegrated in the soil to serve as soil conditioners. Regardless of the resin employed, it may be incorporated into the soil and need not be removed as with prior pre-formed materials.

Although the invention has been schematically illustrated and described herein in reference to spraying a flat bed surface with a liquid sealant, it is understood that in the normal agricultural field the ground surface will be ploughed and cultivated to form alternate parallel rows of raised planting beds and irrigation furrows.

In such types of agricultural fields it is preferred in normal practice to spray the sealant film only over the raised planting beds and leave the irrigation furrows bare of sealant. Generally speaking, there would be no useful purpose served in sealing the furrows because in usual agricultural practice they would not be pre-treated with the same volatile soil chemicals as would the planting beds. There exist today many types of towed or self-propelled vehicles which have their wheels or tracks spaced apart a predetermined distance to ride in only the furrows and upon which can be mounted suitable spray equipment (also spaced apart appropriate distances as desired) to deposit film along only the beds over which the vehicle moves without depositing sprays along the furrows.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for placing and sealing a volatile agricultural chemical in soil comprising: placing a volatile agricultural chemical in soil, and then sealing the surface of the treated soil with a polymeric film to prevent escape of the chemical by spraying the surface of the soil with two converging liquid streams, one of said streams consisting essentially of an aqueous solution of a film forming polymer and the other of said streams consisting essentially of a polymer solidifying component in a liquid solution.

2. A method in accordance with claim 1 wherein said polymer solidifying component is in aqueous solution.

3. A method in accordance with claim 1 wherein said film forming polymer is in acid form and said solidifying component is an aqueous solution of a base.

References Cited by the Examiner

UNITED STATES PATENTS

| | | | |
|---|---|---|---|
| 1,882,377 | 10/32 | Whittelsey | 47—9 |
| 2,663,973 | 12/53 | White | 47—1 |
| 2,801,983 | 8/57 | Dixon. | |
| 2,801,985 | 8/57 | Roth. | |
| 2,813,751 | 11/57 | Barrett | 239—543 X |
| 2,847,392 | 8/58 | Eck. | |
| 2,916,855 | 12/59 | Thiegs | 47—9 X |
| 2,945,322 | 7/60 | Gaeth | 47—9 |
| 2,961,799 | 11/60 | Coe | 47—9 |
| 3,121,973 | 2/64 | Phillips | 47—9 |
| 3,125,294 | 3/64 | Lill | 47—9 X |

FOREIGN PATENTS 1,245,635  10/60  France.

OTHER REFERENCES

Chemical and Engineering News, 36(39): pp. 64, 65. Chemicals.—Carbopal Scales Up, Sept. 29, 1958.

T. GRAHAM CRAVER, *Primary Examiner.*

A. JOSEPH GOLDBERG, *Examiner.*